United States Patent
Kanga et al.

(10) Patent No.: US 10,552,684 B2
(45) Date of Patent: Feb. 4, 2020

(54) IMAGE MANAGEMENT SYSTEM

(71) Applicant: iOmniscient Pty Ltd, Gordon (AU)

(72) Inventors: Rustom Adi Kanga, Gordon (AU); Ivy Lai Chun Li, Gordon (AU)

(73) Assignee: iOmniscient Pty Ltd, Gordon (AU)

( * ) Notice: Subject to any disclaimer, the term of this patent is extended or adjusted under 35 U.S.C. 154(b) by 12 days.

(21) Appl. No.: 14/797,929

(22) Filed: Jul. 13, 2015

(65) Prior Publication Data

US 2016/0014133 A1 Jan. 14, 2016

(30) Foreign Application Priority Data

Jul. 11, 2014 (AU) .................... 2014902686

(51) Int. Cl.
*H04L 29/06* (2006.01)
*G06K 9/00* (2006.01)
*H04N 7/18* (2006.01)

(52) U.S. Cl.
CPC ..... *G06K 9/00744* (2013.01); *G06K 9/00369* (2013.01); *H04L 63/102* (2013.01); *H04N 7/181* (2013.01)

(58) Field of Classification Search
CPC ........ G06T 2210/00; G06K 9/20; H04N 1/00; H04L 63/00; G06F 21/00
See application file for complete search history.

(56) References Cited

U.S. PATENT DOCUMENTS

| | | | | |
|---|---|---|---|---|
| 9,325,951 | B2* | 4/2016 | Saptharishi | ............ H04N 5/772 |
| 2007/0250901 | A1* | 10/2007 | McIntire | ............ H04N 7/17318 |
| | | | | 725/146 |
| 2009/0274434 | A1* | 11/2009 | Mei | .................... G06K 9/00711 |
| | | | | 386/278 |
| 2011/0208722 | A1* | 8/2011 | Hannuksela | ........ G06F 17/3002 |
| | | | | 707/723 |

* cited by examiner

*Primary Examiner* — Joseph P Hirl
*Assistant Examiner* — Leynna T Truvan
(74) *Attorney, Agent, or Firm* — Fitch, Even, Tabin & Flannery LLP

(57) ABSTRACT

There is provided a surveillance management process comprising a management system maintaining a plurality of client accounts that regulate access to image data via a data network, each of the client accounts having an authorization parameter that defines an access level for a corresponding client system, the management system receiving image streams from a surveillance network comprising a plurality of imaging nodes and autonomously producing metadata descriptors from the image streams, the metadata descriptors identifying sub-frame features of an image stream, the management system using the metadata descriptors to classify image data derived from the corresponding sub-frame features in predefined access categories, and the management system using the authorization parameter of the client accounts to regulate access to classified image data, the access level for a client account defining the access categories that a corresponding client system can access.

39 Claims, 2 Drawing Sheets

_US 10,552,684 B2_

IMAGE MANAGEMENT SYSTEM

This application claims priority from Australian Patent Application No. 2014902686, filed Jul. 11, 2014, which is hereby incorporated by reference in its entirety.

FIELD

The present invention relates to the management of image data captured by a network having a plurality of imaging nodes.

BACKGROUND

Surveillance networks (such as CCTV networks) are widely deployed in sophisticated monitoring systems. Prominent applications for electronic surveillance include asset security, congestion management and operational monitoring. Conventional surveillance networks produce a series of surveillance streams that are usually relayed to a control room for evaluation by an operator (such as a security guard or process facility manager).

Surveillance networks are typically established, operated and maintained by the organization using the surveillance streams (such as a business owner or facility operator). Departments within large organizations may operate independent surveillance networks in close proximity with minimal collaboration. Network operators often have limited knowledge of surveillance technology and processes.

SUMMARY

In a first aspect, the present invention provides an image management process comprising:

a management system maintaining a plurality of client accounts that regulate access to image data via a data network, each of the client accounts having an authorization parameter that defines an access level for a corresponding client system, the management system receiving image streams from a surveillance network comprising a plurality of imaging nodes and autonomously producing metadata descriptors from the image streams, the metadata descriptors identifying sub-frame features of an image stream, the management system using the metadata descriptors to classify image data derived from the corresponding sub-frame features in predefined access categories, and the management system using the authorization parameter of the client accounts to regulate access to classified image data, the access level for a client account defining the access categories that a corresponding client system can access.

In an embodiment, the management system implements an autonomous detection routine to identify defined sub-frame features within the image streams received from the surveillance network.

In an embodiment, the management system receives access requests from client computing systems via the data network and selectively facilitates access to sub-frame features from an image stream based on the access category classification for the sub-frame features.

In an embodiment, the management system reproduces an image stream responsive to an access request from a client computing system and autonomously censors sub-frame regions of the reproduced image stream that correspond to sub-frame features not accessible via an access category defined by the corresponding client account.

In an embodiment, the management system reproduces image streams for access categories with different access levels and autonomously censoring sub-frame regions of the reproduced image streams that correspond to sub-frame features not accessible via a corresponding access category.

In an embodiment, the management system autonomously extracts an individual frame from an image stream and transmits the individual frame to a designated client system via the data network responsive to identification of a predefined sub-frame feature.

In an embodiment, the management system receives audio streams from a plurality of audio nodes within the surveillance network and autonomously produces metadata descriptors for audio events detected within the audio streams.

In an embodiment, the management system uses the metadata descriptors to classify image data derived from the detected events in predefined access categories.

In an embodiment, the management system uses the authorization parameter of the client accounts to regulate access to events detected in the audio streams.

In an embodiment, the management system receives independent image streams from a plurality of imaging nodes that are not controlled by the surveillance network and autonomously classifies image data derived from sub-frame features detected within the independent image streams.

In an embodiment, the management system receives chemical trace data from a plurality of chemical detection nodes within the surveillance network and autonomously produces metadata descriptors for chemical signatures detected within the chemical trace data streams.

In an embodiment, the management system synthesizes a plurality of metadata descriptors using defined incident definitions to produce incident metadata for complex events, the complex events comprising combinations of individual events.

In an embodiment, the management system processes metadata derived from a plurality of distinct surveillance nodes to derive incident metadata, the distinct surveillance nodes including an imaging node and a chemical trace node, audio node, traffic signal node, radar node, speed camera node or access control node.

In a second aspect, the present invention provides an image management process comprising:

a management system receiving image streams from a surveillance network comprising a plurality of imaging nodes, the management system implementing an autonomous detection routine to identify defined sub-frame features within the image streams, the management system autonomously generating metadata descriptors for detected sub-frame features and classifying image data derived from the sub-frame features in predefined access categories, and the management system receiving access requests from client computing systems via a data network and selectively facilitating access to sub-frame features from an image stream based on the access category classification for the sub-frame features.

In an embodiment, the management system maintains a plurality of client accounts that regulate access to image data, each of the client accounts having an authorization parameter that defines an access level for a corresponding client system.

In an embodiment, the management system uses the authorization parameter of the client accounts to regulate access to classified sub-frame features, the access level for a client account defining the access categories that a corresponding client system can access.

In an embodiment, the management system reproduces an image stream responsive to an access request from a client computing system and autonomously censors sub-frame regions of the reproduced image stream that correspond to sub-frame features not accessible via an access category defined by the corresponding client account.

In an embodiment, the management system reproduces image streams for access categories with different access levels and autonomously censors sub-frame regions of the reproduced image streams that correspond to sub-frame features not accessible via a corresponding access category.

In an embodiment, the management system autonomously extracts an individual frame from an image stream and transmits the individual frame to a designated client system via the data network responsive to identification of a predefined sub-frame feature.

In an embodiment, the management system receives audio streams from a plurality of audio nodes within the surveillance network and autonomously produces metadata descriptors for audio events detected within the audio streams.

In an embodiment, the management system uses the metadata descriptors to classify image data derived from the detected events in predefined access categories.

In an embodiment, the management system use the authorization parameter of the client accounts to regulate access to events detected in the audio streams.

In an embodiment, the management system receives independent image streams from a plurality of imaging nodes that are not controlled by the surveillance network and autonomously classifies image data derived from sub-frame features detected within the independent image streams.

In an embodiment, the management system receives chemical trace data from a plurality of chemical detection nodes within the surveillance network and autonomously produces metadata descriptors for chemical signatures detected within the chemical trace data streams.

In an embodiment, the management system synthesizes a plurality of metadata descriptors using defined incident definitions to produce incident metadata for complex events, the complex events comprising combinations of individual events.

In an embodiment, the management system processes metadata derived from a plurality of distinct surveillance nodes to derive incident metadata, the distinct surveillance nodes including an imaging node and a chemical trace node, audio node, traffic signal node, radar node, speed camera node or access control node.

In a third aspect, the present invention provides an image management system comprising:

a management computing system that receives image streams from a surveillance network comprising a plurality of imaging nodes, a detection engine that autonomously identifies defined sub-frame features within the image streams and generates metadata descriptors for detected sub-frame features, a categorization module that uses the metadata descriptors generated by the detection engine to classify image data derived from detected sub-frame features in predefined access categories, and an access gateway that receives access requests from client computing systems and selectively facilitates access to sub-frame features from an image stream based on the access category classification for the sub-frame features.

In an embodiment, the system comprises an account module that maintains a plurality of client accounts, each of the client accounts having an authorization parameter that defines an access level for a corresponding client system and regulates access to image data managed by the management system.

In an embodiment, the access gateway uses the authorization parameter of a client account to regulate access to classified image data features, the access level for a client account defining the access categories that a corresponding client system can access.

In an embodiment, the system comprises an archival engine that reproduces an image stream responsive to an access request from a client computing system and autonomously censors sub-frame regions of the reproduced image stream that correspond to sub-frame features not accessible via an access category defined by a corresponding client account.

In an embodiment, the system comprises an archival engine that reproduces image streams for access categories with different access levels and autonomously censors sub-frame regions of the reproduced image streams that correspond to sub-frame features not accessible via a corresponding access category.

In an embodiment, the system comprises a video management module that receives independent image streams from a plurality of imaging nodes that are not controlled by the surveillance network and autonomously classifies sub-frame features detected within the independent image streams.

In an embodiment, the system comprises a linking engine that synthesizes a plurality of metadata descriptors using defined incident definitions to produce incident metadata for complex events, the complex events comprising combinations of individual events.

In an embodiment, the linking engine processes metadata derived from a plurality of distinct surveillance nodes to derive incident metadata, the distinct surveillance nodes including an imaging node and a chemical trace node, audio node, traffic signal node, radar node, speed camera node or access control node.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION

Figure 1:
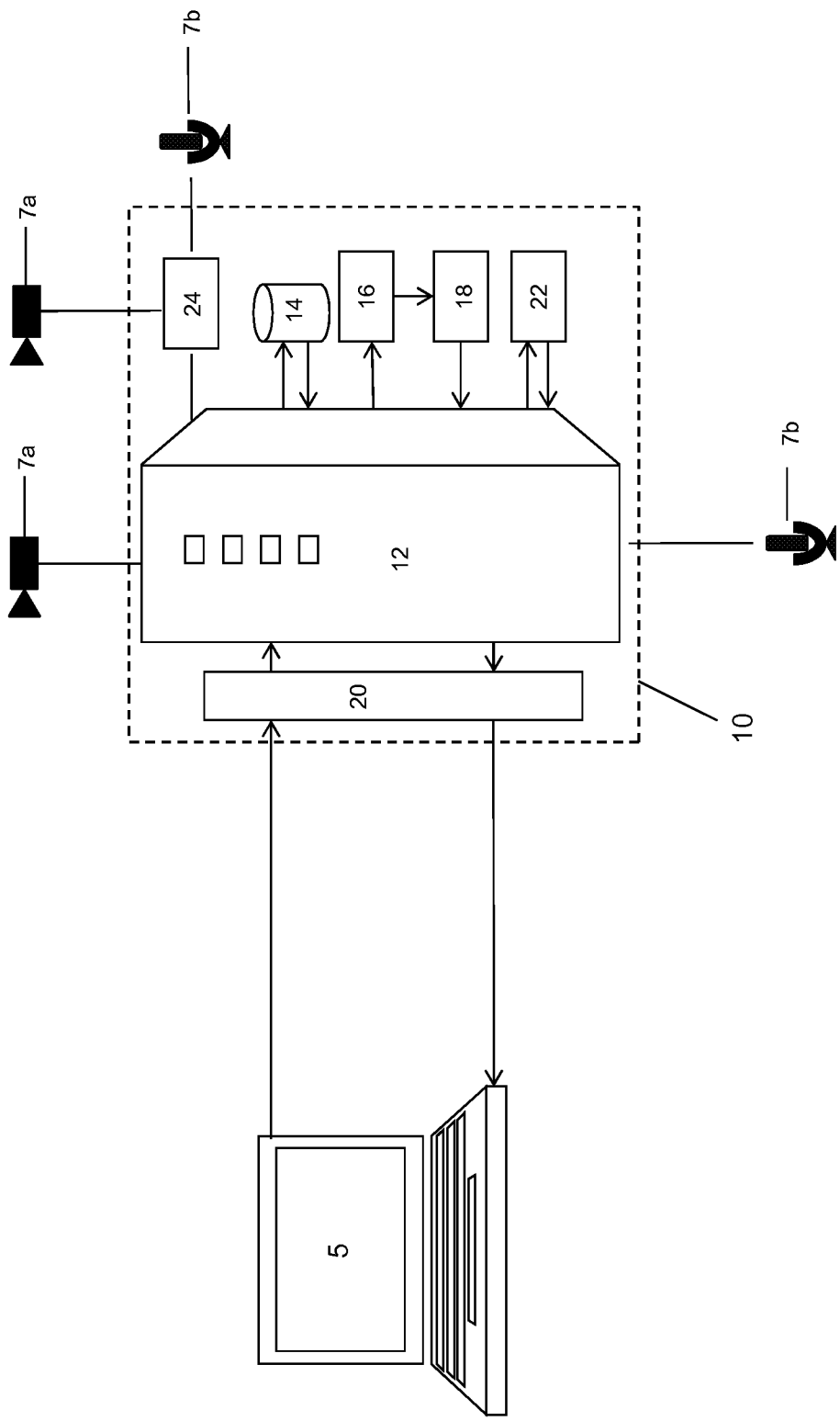
FIG. 1 is a schematic representation of an image management system.

Embodiments of a surveillance management process and system are disclosed in this specification. The disclosed system consolidates image streams from multiple sources and controls access to image data (such as image content and metadata) derived from the image streams. Individual client systems can access image data maintained by the management system via a data network (such as the Internet). Each client system is allocated an access level that dictates the image data that the client system can access.

The access level allocated to client systems may be prescribed by organizational hierarchies (such as employee roles within an organization) or subscription policies maintained with an independent network operator. Subscription based network access may incorporate usage components that reflect the data accessed by client systems (including data volume and type).

The management system receives image streams from a surveillance network and processes image content contained within the streams for presentation to client computing systems. The surveillance network incorporates several image nodes (such as CCTV cameras) that are controlled by the management system. Image streams may also be sourced from independent contributors (such as image content captured by news agencies or mobile phones) and incorporated in the surveillance network. Other forms of surveillance nodes (such as audio nodes, access control systems, speed camera nodes, radar systems and trace chemical nodes) may be integrated in the network to augment the received image streams.

The management system compiles image data (such as image content and metadata) from the surveillance network in a content repository that is maintained in non-volatile system memory. Authenticated client systems can search the content repository and access stored image data. The management system regulates access to image data based on defined access principles.

Client computing systems requisition stored image data from the management system via a secure data connection. The data connection is typically established by the management system at the conclusion of a prescribed authentication process. The management system determines an access level for individual client systems during the authentication process and uses the access level to regulate the image data that a corresponding client system can access. The management system may classify image data in predefined access categories to facilitate the access process.

The management system processes the received image streams using detection routines that identify defined features captured in image content. Detected features are classified and the corresponding image data stored in predefined categories. The management system can use the categories to regulate access by client systems. The image data (including sub-frame image content) may be censored before classification. The management system censors image data (such as sub-frame image features) for individual categories to prevent unauthorized data access. Typical censorship operations include extraction and/or obscuring sub-frame image content that is not accessible via a corresponding category.

The management system may implement several independent detection routines to identify defined sub-frame features within an image stream and generate metadata descriptors. Typical image detection routines include license plate detection, facial recognition, complex incident identification (derived from event combinations), object counting (such as pedestrian and car counting routines) and non-motion (abandoned object) determination. The system may also derive information from other surveillance nodes such as traffic signals, audio nodes, trace chemical sensors and access control systems (typically security card readers).

The metadata descriptors produced by the management system identify sub-frame features detected in the image streams and typically include a frame reference for the corresponding content (such as frame co-ordinates). The management system uses the metadata descriptors to classify image data derived from the corresponding sub-frame features in predefined access categories. Metadata from related sub-frame features may be synthesized to produce incident metadata. The incident metadata defines complex events that comprise several interrelated incidents detected in the image streams. The management system uses defined incident definitions to produce the incident metadata. Metadata derived from other surveillance streams (such as audio streams) may be combined with the image metadata during this process.

Detected sub-frame features are classified using an event repository with prescribed access conditions for image data. The event repository defines access levels for image features applicable to the implemented detection routines. Each of the access categories maintained by the management system has a compatible access level. The management system determines the access level for a detected sub-frame feature from the event repository and classifies the corresponding image data (such as image content and/or metadata) in an access category with a commensurate access level.

The management system maintains client accounts that facilitate access to stored image data. Each of the client accounts has an authorization parameter that determines the image data available to a corresponding client system following a prescribed authentication process (such as a secure 'log on' procedure). The authorization parameter defines an access level that can be derived from hierarchical authorization structures (such as security clearance ratings and subscription based access) or spatially allocated (such as access to defined surveillance zones).

The management system uses the authorization parameter of the client accounts to regulate access to classified image data. The access level allocated to a client account determines the categories that a corresponding client system can access. The access levels maintained by the management system for client accounts and access categories are compatible. The management system compares the respective access levels to determine the access categories accessible to an authenticated client system.

Access requests from client computing systems are received via a data network (such as the Internet). The management system selectively facilitates access to image data (such as sub-frame image content captured in an image stream) after successful authentication of a corresponding client account. Client systems are granted access to image content and metadata based on the authorization parameter of the client account and the access category classification for the image data. The management system determines the client account access level for a client system (typically during the client authentication process) and facilitates access to an image data category with a commensurate access level.

Image Management System

A schematic representation of an image management system 10 is depicted in FIG. 1. The illustrated management system 10 comprises several components that represent functional elements of a computing system. The components do not necessarily represent defined system hardware. The fundamental functionality of the illustrated components can be implemented with various software and hardware arrangements. For instance, the entire system may be integrated in a single centralized server or distributed across several interconnected computing systems (including virtual machines).

The functional components illustrated in FIG. 1 may be implemented in any suitable computing architecture, such as cloud based systems, virtual machine(s) operating on shared hardware, dedicated hardware machine(s) or a server bank of connected hardware and/or virtual machines. The term 'server' in this specification represents general computing system functionality and is not limited to a particular type of hardware architecture.

The illustrated image management system 10 includes a management computing system 12 (such as a server or virtual machine) that co-ordinates image data processing. The management computing system 12 receives surveillance feeds from a plurality of nodes 7 (including imaging nodes) that are organized in a surveillance network. The image streams received by the image management system 10 may include periodic image data (such as CCTV video and time-lapse photography streams) and/or event driven image data (such images captured responsive to a trigger event).

The illustrated surveillance network comprises imaging nodes 7a (such as CCTV cameras) and audio nodes 7b (such as long range microphones). Other possible surveillance nodes include chemical trace detection units (such as vapour or trace particle detectors), access control systems (such as security card readers), radar, speed camera units, traffic signal systems, and environmental sensors (such as strain gauges, pressure sensors and temperature sensors). The image management system 10 collects data streams from each of the nodes in the surveillance network and analyses the corresponding data using compatible detection processing to identify predefined events.

Typical image processing routines that the management system 10 may implement include license plate identification, facial recognition, abandoned object detection (such as non-motion detection) and complex event determination (such as traffic congestion or accident detection). The image management system 10 includes a detection engine 16 that autonomously identifies sub-frame features contained within the image streams (such as individual faces or license plates) and generates metadata descriptors for the detected features. The metadata descriptors reference corresponding segments of the image stream to facilitate archival processing (such as indexed searching and image retrieval).

The detection engine 16 may be implemented by the management server 12 (illustrated in FIG. 1) or an independent computing system (not shown in the drawings). The metadata generated by the detection engine 16 is transferred to a categorization module 18 that uses the metadata descriptors to classify detected sub-frame features. The categorization module 18 maintains a set of predefined access categories with associated access levels. The management system 10 uses the access categories to regulate access to the image data (such as image content and metadata) stored by the management server 12.

The management system 10 is also capable of processing data received from alternate surveillance nodes (such as audio receivers 7b and chemical trace units). The depicted management server 12 receives audio streams from two audio nodes 7b. The audio streams are processed using dedicated detection routines that are implemented by the detection engine 18. The detection engine 18 produces metadata descriptors for audio events detected in the audio streams. The metadata descriptors are used by the categorization module 18 to classify the audio events (typically using the access categories established for image data). Similar processing operations can be implemented for other surveillance node streams (such as chemical trace streams).

The management server 12 illustrated in FIG. 1 has an account module 14 that maintains client accounts for the management system 10. The client accounts are stored in non-volatile system memory using a database, indexed file store or another data storage structure. Each of the client accounts has an authorization parameter that defines an access level for a corresponding client system 5. The management server 12 determines the access categories a client system 5 can access by comparing the authorization parameter of a corresponding client account to the access level for the respective categories.

The categorization module 18 may employ a nested access structure (where successive access levels expand the image data available to the client system 5) to simplify access processing. Segments of an image stream that exceed the access level for an individual category can be excluded from the category entirely or reproduced without the restricted features (such as defined sub-frame features identified by the detection engine 16 or sensitive metadata). The image management system depicted in FIG. 1 incorporates an archival engine 22 that reproduces image streams for compatibility with access categories.

The archival engine 22 autonomously censors the image streams reproduced for each access category to remove content that is not accessible at the corresponding access level. Image content and/or metadata descriptors may be removed from the reproduced image streams to comply with the access level allocated to the access category. The archival engine 22 uses the metadata descriptors generated by the detection engine 18 to identify restricted content (such as the names and faces of individuals identified by the management system 10) and isolate corresponding segments of the image stream. The metadata descriptors generally define the image features detected by the detection engine 18 and a frame reference for the corresponding content within the image stream (such as frame co-ordinates).

The archival engine 22 extracts or obscures sub-frame regions of the reproduced image stream that contain features not accessible at a defined access level. This can include the entire image frame in some applications. Metadata descriptors may also be removed prior to categorization of a corresponding image stream. The archival engine 22 is capable of reproducing received image streams during categorization and/or responsive to requests from client systems 5 depending on system constraints.

The management system 10 generally stores an uncensored version of each image stream in non-volatile system memory. Client accounts with the highest access level may be granted access to the uncensored image stream. The archival engine 22 reproduces the received image streams for the remaining access categories and removes restricted image data from the respective reproductions. The management system 10 is capable of interlacing reproduced segments of an image stream (such as individual image frames that have been censored by the archival engine 22) with the uncensored image stream during 'play back' to reduce system memory usage.

An access gateway 20 coordinates interactions with client computing systems 5 for the management system 10. The access gateway 20 receives access requests from client computing systems 5 and selectively facilitates access to image data stored in non-volatile memory within the management server 12. Data access determinations made by the access gateway 20 are primarily based on the access level of the client system 5 (derived from a corresponding client account).

The authorization parameter allotted to each client account determines the image data a corresponding client system 5 can access via the access gateway 20. The access gateway 20 uses the client account access level to determine the access categories the client system 5 is authorized to access. Client systems 5 access the access gateway 20 via a data network (such as the Internet). The access gate 20 may be hosted by the management server 12 or an independent computing system (such as a firewall server).

The depicted management system 10 receives independent image streams from a plurality of imaging nodes that are not controlled by the surveillance network (such as image content captured by news agencies or mobile phones). Independent image stream reception and initial processing is coordinated by a video management module 24 that is typically integrated with the management server 12.

The video management module 24 receives image streams from the independent source nodes and processes the image content for compatibility with other management system components. Typical processing operations can include frame rate adjustments, resolution compensation and data rate modulation. The independent image streams are subsequently integrated with the surveillance network and classified for access by client computing systems 5.

The managements system 10 may generate incident metadata for related events detected in the surveillance streams. This function is typically performed by a linking engine (not shown in the figures). The linking engine synthesizes metadata descriptors for a plurality of detected events using defined incident definitions. The incident definitions typically define spatial and temporal relationships between detected events that indicate interdependence.

The linking engine produces incident metadata for complex events that comprise combinations of individual events detected in the surveillance streams. The criteria for complex events are defined in the incident definitions. Typical criteria include the spatial and temporal proximity of prescribed events.

Metadata derived from distinct surveillance streams may be combined to generate incident metadata. A plurality of distinct surveillance nodes may be used in this process. Typical surveillance nodes include imaging nodes, chemical trace nodes, audio nodes, traffic signal nodes, radar nodes, speed camera nodes and access control nodes. For example, the detection of an incapacitated person in image data can be combined with an audio gunshot event to characterize a 'shooting incident' (instead of a slip and fall event based on the image data independently).

Image Management Process

Figure 2:
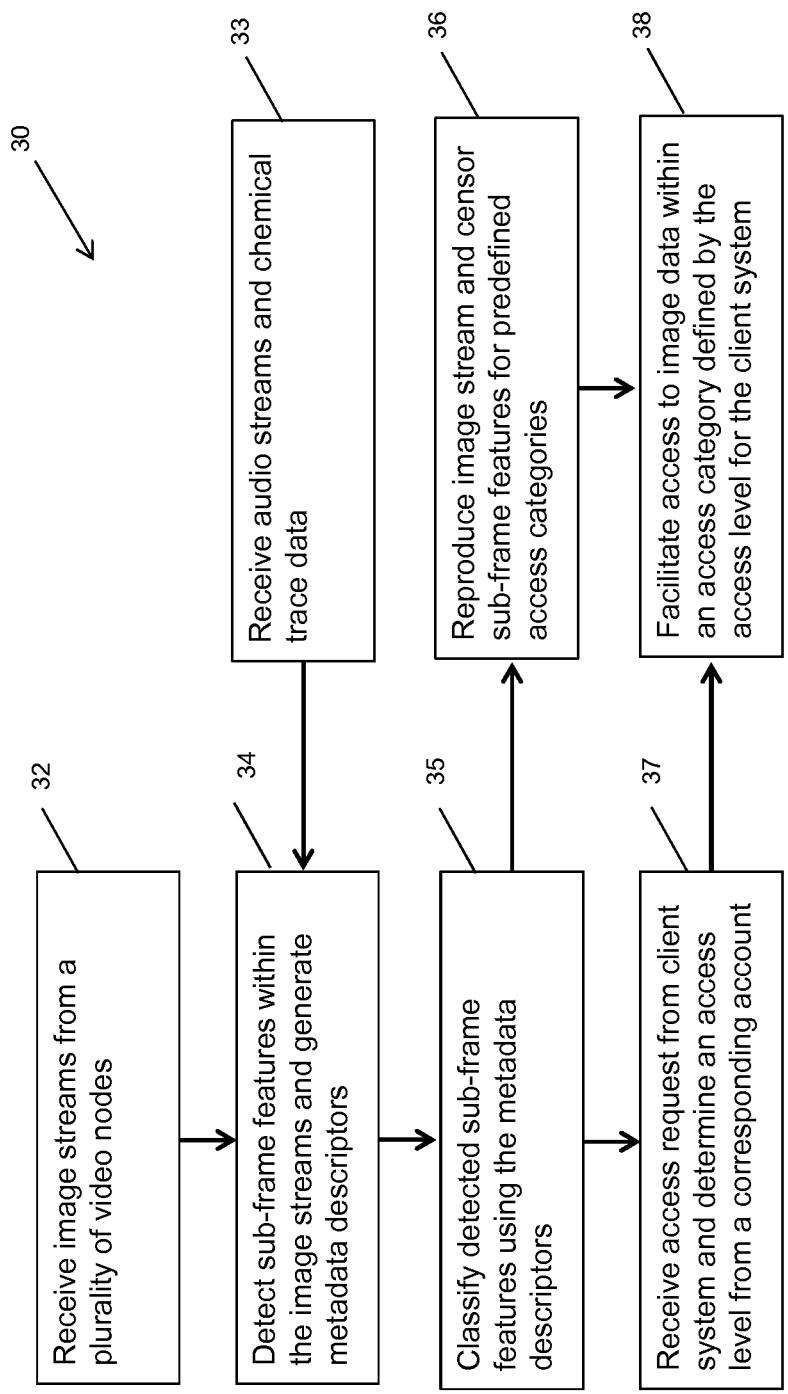
FIG. 2 is a flow diagram representation of an image management process.

A flow diagram representation of an image management process is depicted in FIG. 2. The illustrated process 30 is typically implemented by a network connected computing system (such as the management server 12 depicted in FIG. 1). The operations contained in the process flow diagram include:
- receiving image streams from a plurality of video nodes (operation 32),
- detecting sub-frame features within the image streams and generating metadata descriptors (operation 34),
- classifying detected sub-frame features using the metadata descriptors (operation 35), and
- receiving access request from client systems and determining an access level from a corresponding account (operation 37).

The depicted process flow 30 reflects the general operations performed by the management server 12. Additional operations that the management server 12 may perform include:
- receiving other surveillance streams, such as audio streams and chemical trace data (operation 33),
- reproducing image streams and censoring sub-frame features for predefined access categories (operation 36), and
- facilitating access to image data within an access category defined by the access level for a client system (operation 38).

The functionality of the image management system can be augmented with auxiliary modules that perform dedicated tasks for defined applications. For instance, the management system may incorporate a monitoring module for security applications. The monitoring module expands the monitoring capabilities of the management system by providing additional functionality. The monitoring operations performed by a dedicated monitoring module can include:
- autonomously extracting individual frames from an image stream responsive to identification of a predefined sub-frame feature for independent storage in an event repository,
- transmission of extracted frames to a designated client system (such as a mobile phone) via a data network, and
- generation of an alarm and/or initiation of remedial action responsive to detection of a predefined event or series of events.

The disclosed image management system is capable of consolidating image streams from independent networks to improve surveillance coverage and efficiency. The system can be used to manage new and/or existing surveillance networks (such as CCTV networks) commonly operated by private security firms, banks, local governments and police. An exemplary application within an airport CCTV network is presented in this section.

Most airports have multiple independent divisions that operate with some level autonomy. Several possible airport divisions are summarized in Table 1.1.

TABLE 1.1

Exemplary airport operational divisions

| Division | FaceID | Vehicles | Pedestrians | Queues | Passport | TempID |
|---|---|---|---|---|---|---|
| Police | x | x | x | | | |
| Security | x | x | x | | | |
| Operations | | x | x | x | | |
| Immigration | x | | | | x | |
| Quarantine | | | | | | x |
| Commercial | | | x | x | | |
| Safety | | | x | x | | |

The exemplary operating divisions outlined in Table 1.1 demonstrate how different stakeholders within an organization use surveillance facilities. Each division often operates an independent surveillance network (such as a CCTV network) that reflects the specific objectives of the division. The cost of monitoring and maintaining multiple independent surveillance networks within an organization typically exceeds the operating costs for a single consolidated network.

The surveillance capabilities implemented by each division usually reflect operational objectives. Some divisions may have specific surveillance objectives that are not applicable to other divisions. For example, the quarantine division outlined in Table 1.1 uses thermal imaging to detect and detain passengers with elevated body temperature (indicative of communicable disease). This functionality (denoted TempID) is not used by other divisions. Other surveillance capabilities overlap several operational divisions. For example, pedestrian monitoring is used in some form by five of the seven divisions summarized in Table 1.1.

The image management system 10 depicted in FIG. 1 is capable of consolidating surveillance streams produced by the individual airport divisions and regulating access to corresponding surveillance data. The management system 10 produces metadata descriptors for each image stream. The metadata descriptors identify features contained within individual frames the image stream (such as faces, license plates and abandoned baggage).

The image management system 10 uses the metadata descriptors to regulate access of image content. For example, the image content that the operations division can access may be censored to obscure pedestrian faces (typically by pixelating discrete regions within individual image frames that correspond to detected face). The management system 10 also regulates access to metadata descriptors generated from the image content. For example, the operations divisions may be granted access to statistical pedestrian metadata without receiving facial recognition data derived from the original image content.

Exemplary metadata descriptors for a departure area image stream may include:
  temporal pedestrian head counts,
  the spatial division of foot traffic,
  pedestrian dwell times,
  queues for check points and service areas,
  identification of abandoned objections,
  vandalism detection,
  overcrowding and/or congestion identification,
  smoke detection,
  unauthorized access to secure zones (intrusion detection), and
  identification of individuals (via facial recognition).

The management system 10 uses the metadata descriptors to classify the surveillance data (including the metadata descriptors produced by the management system 10) in predefined access categories. The access categories are used by the management system 10 to regulate access to surveillance data (both real-time and stored). The management system 10 is capable of reproducing image streams without sensitive sub-frame features for compatibility with individual access categories. For example, the management system 10 may 'obscure' or 'pixelate' facial features, license plate numbers or passport information within the frame of an image (i.e. detected sub-frame features of the image stream) that is made accessible to the commercial division of the airport. The management system 10 may also extract sub-frame features from an image stream for independent storage (such as facial images and license plates) as described in PCT application PCT/AU2009/000668 (published as WO 2009/135253), which is incorporated herein by reference.

The management system 10 may use a hierarchical access structure to regulate access. Possible regulatory divisions within a hierarchical access structure include:
  spatial access restrictions—e.g. access to facial recognition data by the immigration division may be restricted to content derived from a defined immigration area,
  content access restrictions—e.g. access to vehicle data by the operations division may be limited to statistical metadata (such as vehicle counts and congestion parameters) with strict limitations on license plate data, and
  temporal access restrictions—e.g. quarantine officials may be granted access to recent thermal imaging data (such as thermal images captured within the past 12 hours).

The airport police are often granted unrestricted access to surveillance data. Other divisions are typically limited to a subset of access categories. For example, commercial operating divisions (such as advertising placement teams) are granted limited access to pedestrian data (such as foot traffic statistics and dwell times) and queue data. The management system 10 regulates the access capabilities of each division with an authorization parameter that is allocated to the account for each division.

Individual authorization parameters define an access level for the corresponding operating division. The management system 10 verifies data access requests by comparing the authorization parameter with compatible access levels allocated to the individual access categories. This can be facilitated by allocating bits within an 'integer' authorization parameter to individual access categories (similar to traditional Unix permission control).

The management system 10 may maintain a reference table with authorization parameter definitions for the operating divisions. The reference table links distinct operating divisions to defined surveillance data categories. The managements system 10 evaluates access requests from client systems by interrogating the reference table and extracting an authorization parameter for a corresponding surveillance data category. The reference table may span multiple dimensions to accommodate multifaceted data.

Cost Distribution for Consolidated Surveillance Networks

The operating costs for consolidated surveillance networks may be distributed within an organization based on the usage characteristics of individual divisions.

Typical usage characteristics that the management system 10 may use to determine a suitable cost distribution include:
  the access level allocated to a division,
  the volume of content retrieved by a division during a prescribed period, and
  the form of retrieved content.

For example, the management system 10 may determine periodic charges for the airport police based on a monthly subscription (derived from the division's access level) and usage charges (derived from the quantity of content accessed during the charging period). The form of content retrieved by a division may also be factored into cost determinations. Content that is derived using sophisticated detection and identification routines (such as facial recognition data, statistical traffic data and pedestrian dwell times) is typically charged at a higher usage rate than raw data and data derived from comparatively less sophisticated algorithms.

The management system 10 maintains a schedule of content charging rates for captured data. Content charging rates often reflect the value of the data to divisions within an organization. The base subscription rate paid by a division may also influence usage charges (i.e. usage charges may be offset by base subscription charges). For example, the airport police may be charged a relatively high subscription rate (attributable to the high access level the division is granted) and relatively low usage rates compared to other divisions (such as the safety division). Some subscription packages may also include 'prepaid' data usage (i.e. no usage charges within prescribed usage limits).

Independent network operators that administer shared surveillance services (such as shopping mall surveillance networks) may also implement content based charging models to distribute costs and generate revenue. The management system 10 is capable of determining periodic usage charges from the volume of surveillance data a client system retrieves, the form of the retrieved data and the allocated access category for the retrieved data.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be understood to persons skilled in the art of the invention that many modifications may be made without departing from the spirit and scope of the invention.

The invention claimed is:

1. A surveillance management process for the management of surveillance of defined features that may occur within scene(s) being surveyed, comprising:
 a management system maintaining a plurality of client accounts that regulate access to image data of images of the scene being surveyed, via a data network, each of the client accounts having an authorization parameter that defines an access level to the image data for a corresponding client system,
 the management system receiving image streams from a surveillance network comprising a plurality of imaging nodes, autonomously processing the image streams to identify defined features within the scene(s) being surveyed and autonomously producing metadata descriptors from the image streams, the metadata descriptors identifying sub-frame features within sub-frame regions of the images of the scene(s) being surveyed,
 the management system using the metadata descriptors to classify image data of the sub-frame regions of the images of the scene(s) being surveyed, derived from the corresponding sub-frame features located therein, in predefined access categories,
 the management system using the authorization parameter of the client accounts to regulate access to classified image data of the sub-frame regions of the images of the scene(s) being surveyed, the access level for a client account defining the access categories that a corresponding client system can access; and
 the management system reproducing image streams for access categories with different access levels and autonomously censoring sub-frame regions of the reproduced image streams that correspond to sub-frame features not accessible via a corresponding access category, to censor the features of the images of the scene(s) so that they cannot be viewed by the client.

2. The process of claim 1 comprising the management system implementing an autonomous detection routine to identify the defined sub-frame features within the image streams received from the surveillance network.

3. The process of claim 2, wherein the autonomous detection routine comprises one or more of license plate detection, facial recognition, complex incident identification, object counting and non-motion determination.

4. The process of claim 1 comprising the management system receiving access requests from client computing systems via the data network and selectively facilitating access to sub-frame regions of images of the scene(s) being surveyed based on the access category classification for the sub-frame features contained in the sub-frame regions.

5. The process of claim 4, wherein said management system reproducing image streams and autonomously censoring sub-frame regions of the reproduced image streams is responsive to receiving said access requests.

6. The process of claim 5, wherein the management system enables the client to view the part of the frame which is not censored.

7. The process of claim 1 comprising the management system autonomously extracting an individual frame from an image stream and transmitting the individual frame to a designated client system via the data network responsive to identification of a predefined sub-frame feature.

8. The process of claim 1 comprising the management system receiving audio streams from a plurality of audio nodes within the surveillance network and autonomously producing metadata descriptors for audio events of events occurring within the scene(s) being surveyed, detected within the audio streams.

9. The process of claim 8 comprising the management system using the metadata descriptors to classify image data derived from the detected events in predefined access categories.

10. The process of claim 9 comprising the management system using the authorization parameter of the client accounts to regulate access to events detected in the audio streams.

11. The process of claim 1 comprising the management system receiving independent image streams from a plurality of imaging nodes that are not controlled by the surveillance network and autonomously classifying image data derived from sub-frame features detected within the independent image streams.

12. The process of claim 1 comprising the management system receiving chemical trace data from a plurality of chemical detection nodes within the surveillance network and autonomously producing metadata descriptors for chemical signatures of chemicals present at the scene(s) being surveyed, detected within the chemical trace data streams.

13. The process of claim 1 comprising the management system synthesizing a plurality of metadata descriptors using defined incident definitions to produce incident metadata for complex events, the complex events comprising combinations of individual events occurring in the scene(s) being surveyed.

14. The process of claim 13 comprising the management system processing metadata derived from a plurality of distinct surveillance nodes to derive incident metadata, the distinct surveillance nodes including an imaging node and a chemical trace node, audio node, traffic signal node, radar node, speed camera node or access control node.

15. The process of claim 1, wherein the management system enables the client to view the part of the frame which is not censored.

16. A surveillance management process for the management of surveillance of defined features that may occur within scene(s) being surveyed comprising:
 a management system receiving image streams from a surveillance network comprising a plurality of imaging nodes,
 the management system implementing an autonomous detection routine to process the image streams to identify defined feature within the scene(s) being surveyed, as sub-frame features of images of sub-frame regions of the scene(s) being surveyed, within the image streams,
 the management system autonomously generating metadata descriptors for detected sub-frame features of images of the scene(s) being surveyed, and classifying image data of the sub-frame regions of the images of the scene(s) being surveyed, derived from the sub-frame features located therein, in predefined access categories,
 the management system receiving access requests from client computing systems via a data network and selectively facilitating access to sub-frame regions containing the sub-frame features, from an image stream based on the access category classification for the sub-frame features in the sub-frame regions, and the management system reproducing image streams for access categories with different access levels and autonomously censoring sub-frame regions of the reproduced image streams that correspond to sub-frame features not accessible via a corresponding access category, whereby features in the scene(s) corresponding to the sub-frame features cannot be viewed in the image stream provided to the client.

17. The process of claim 16 comprising the management system maintaining a plurality of client accounts that regulate access to sub-frame regions of images of the scene(s) being surveyed, each of the client accounts having an authorization parameter that defines an access level for a corresponding client system.

18. The process of claim 17 comprising the management system using the authorization parameter of the client accounts to regulate access to classified sub-frame regions, the access level for a client account defining the access categories that a corresponding client system can access.

19. The process of claim 16, wherein said management system reproducing image streams and autonomously censoring sub-frame regions of the reproduced image streams is responsive to receiving said access requests.

20. The process of claim 16 comprising the management system autonomously extracting an individual frame from an image stream and transmitting the individual frame to a designated client system via the data network responsive to identification of a predefined sub-frame feature.

21. The process of claim 16 comprising the management system receiving audio streams from a plurality of audio nodes within the surveillance network and autonomously producing metadata descriptors for audio events of events occurring within the scene(s) being surveyed, detected within the audio streams.

22. The process of claim 21 comprising the management system using the metadata descriptors to classify image data derived from the detected events in predefined access categories.

23. The process of claim 22 comprising the management system using the authorization parameter of the client accounts to regulate access to events detected in the audio streams.

24. The process of claim 16 comprising the management system receiving independent image streams from a plurality of imaging nodes that are not controlled by the surveillance network and autonomously classifying image data derived from sub-frame features detected within the independent image streams.

25. The process of claim 16 comprising the management system receiving chemical trace data from a plurality of chemical detection nodes within the surveillance network and autonomously producing metadata descriptors for chemical signatures of chemicals present at the scene(s) being surveyed, detected within the chemical trace data streams.

26. The process of claim 16 comprising the management system synthesizing a plurality of metadata descriptors using defined incident definitions to produce incident metadata for complex events, the complex events comprising combinations of individual events occurring in the scene(s) being surveyed.

27. The process of claim 16 comprising the management system processing metadata derived from a plurality of distinct surveillance nodes to derive incident metadata, the distinct surveillance nodes including an imaging node and a chemical trace node, audio node, traffic signal node, radar node, speed camera node or access control node.

28. The process of claim 16, wherein the autonomous detection routine comprises one or more of license plate detection, facial recognition, complex incident identification, object counting and non-motion determination.

29. The process of claim 28, wherein a detection engine is arranged to autonomously process the image streams by implementing an image detection routine including one or more of license plate detection, facial recognition, complex incident identification, object counting and non-motion determination.

30. A surveillance management system for the management of surveillance of defined features that may occur within scene(s) being surveyed, comprising:

a management computing system that receives image streams of images of the scene being surveyed, from a surveillance network comprising a plurality of imaging nodes, a detection engine that autonomously processes the image streams to identify defined features within sub-frame regions of the scene(s) being surveyed, as sub-frame features within the image streams, and generates metadata descriptors for detected sub-frame features of images of the scene(s) being surveyed, a categorization module that uses the metadata descriptors generated by the detection engine to classify image data of the sub-frame regions of images of the scene(s) being surveyed, derived from detected sub-frame features located therein, in predefined access categories, an access gateway that receives access requests from client computing systems and selectively facilitates access to sub-frame regions of images of the scene(s) being surveyed from an image stream based on the access category classification for the sub-frame features in the sub-frame regions, and an archival engine that reproduces image streams for access categories with different access levels and autonomously censors sub-frame regions of the reproduced image streams that correspond to sub-frame features not accessible via a corresponding access category, whereby features in the scene(s) corresponding to the sub-frame features cannot be viewed in the image stream provided to the client.

31. The system of claim 30 comprising an account module that maintains a plurality of client accounts, each of the client accounts having an authorization parameter that defines an access level for a corresponding client system and regulates access to image data, of images of the scene(s) being surveyed, managed by the management system.

32. The system of claim 31 wherein the access gateway uses the authorization parameter of a client account to regulate access to classified image data features, the access level for a client account defining the access categories that a corresponding client system can access.

33. The system of claim 30, wherein said archival engine reproduces image streams and autonomously censoring sub-frame regions of the reproduced image streams, responsive to access requests being received.

34. The system of claim 30 comprising a video management module that receives independent image streams from a plurality of imaging nodes that are not controlled by the surveillance network and autonomously classifies sub-frame features of the images of the scene(s) being surveyed, detected within the independent image streams.

35. The system of claim 30 comprising a linking engine that synthesizes a plurality of metadata descriptors using defined incident definitions to produce incident metadata for complex events, the complex events comprising combinations of individual events occurring in the scene(s) being surveyed.

36. The system of claim 35 wherein the linking engine processes metadata derived from a plurality of distinct surveillance nodes to derive incident metadata, the distinct surveillance nodes including an imaging node and a chemical trace node, audio node, traffic signal node, radar node, speed camera node or access control node.

37. A surveillance management process for the management of surveillance of defined features that may occur within scene(s) being surveyed, comprising:

a management system maintaining a plurality of client accounts that regulate access to image data of images of the scene being surveyed, via a data network, each of the client accounts having an authorization parameter that defines an access level to the image data for a corresponding client system, the management system receiving image streams from a surveillance network comprising a plurality of imaging nodes, autonomously processing the image streams to identify defined features within the scene(s) being surveyed and autonomously producing metadata descriptors from the image streams, the metadata descriptors identifying sub-frame features within sub-frame regions of the images of the scene(s) being surveyed, the management system using the metadata descriptors to classify image data of the sub-frame regions of the images of the scene(s) being surveyed, derived from the corresponding sub-frame features located therein, in predefined access categories, the management system using the authorization parameter of the client accounts to regulate access to classified image data of the sub-frame regions of the images of the scene(s) being surveyed, the access level for a client account defining the access categories that a corresponding client system can access, and the management system receiving access requests from client computing systems via the data network and selectively facilitating access to sub-frame regions of images of the scene(s) being surveyed based on the access category classification for the sub-frame features contained in the sub-frame regions, wherein the management system reproduces an image stream responsive to an access request from a client computing system and autonomously censors sub-frame regions of the reproduced image stream that correspond to sub-frame features not accessible via an access category defined by the corresponding client account, to censor the features of the image of the scene(s) so that they cannot be viewed by the client.

38. A surveillance management process for the management of surveillance of defined features that may occur within scene(s) being surveyed comprising:

a management system receiving image streams from a surveillance network comprising a plurality of imaging nodes, the management system implementing an autonomous detection routine to process the image streams to identify defined feature within the scene(s) being surveyed, as sub-frame features of images of sub-frame regions of the scene(s) being surveyed, within the image streams, the management system autonomously generating metadata descriptors for detected sub-frame features of images of the scene(s) being surveyed, and classifying image data of the sub-frame regions of the images of the scene(s) being surveyed, derived from the sub-frame features located therein, in predefined access categories, the management system receiving access requests from client computing systems via a data network and selectively facilitating access to sub-frame regions containing the sub-frame features, from an image stream based on the access category classification for the sub-frame features in the sub-frame regions, and the management system reproducing an image stream responsive to an access request from a client computing system and autonomously censoring sub-frame regions of the reproduced image stream that correspond to sub-frame features not accessible via an access category defined by the corresponding client account, whereby features in the scene(s) corresponding to the sub-frame features cannot be viewed in the image stream provided to the client.

39. A surveillance management system for the management of surveillance of defined features that may occur within scene(s) being surveyed, comprising:

a management computing system that receives image streams of images of the scene being surveyed, from a surveillance network comprising a plurality of imaging nodes, a detection engine that autonomously processes the image streams to identify defined features within sub-frame regions of the scene(s) being surveyed, as sub-frame features within the image streams, and generates metadata descriptors for detected sub-frame features of images of the scene(s) being surveyed, a categorization module that uses the metadata descriptors generated by the detection engine to classify image data of the sub-frame regions of images of the scene(s) being surveyed, derived from detected sub-frame features located therein, in predefined access categories, an access gateway that receives access requests from client computing systems and selectively facilitates access to sub-frame regions of images of the scene(s) being surveyed from an image stream based on the access category classification for the sub-frame features in the sub-frame regions, and an archival engine that reproduces an image stream of images of the scene(s) being surveyed, responsive to an access request from a client computing system and autonomously censors sub-frame regions of the reproduced image stream that correspond to sub-frame features not accessible via an access category defined by a corresponding client account, whereby features in the scene(s) corresponding to the sub-frame features cannot be viewed in the image stream provided to the client.

* * * * *